Jan. 12, 1971     H. SCHWARTZ ET AL     3,553,956
DOUBLE HAIRSPRING CLAMPING DEVICE
Filed Sept. 11, 1969     3 Sheets-Sheet 1

INVENTORS
HERBERT SCHWARTZ
ROLF WEISE
BY
Davis, Hoxie, Faithfull & Hapgood
ATTORNEYS United States Patent Office 3,553,956
Patented Jan. 12, 1971

3,553,956
DOUBLE HAIRSPRING CLAMPING DEVICE
Herbert Schwartz, Wurmberg, and Rolf Weise, Pforzheim, Germany, assignors to Timex Corporation, Waterbury, Conn., a corporation of Connecticut
Filed Sept. 11, 1969, Ser. No. 857,110
Int. Cl. G04c 3/04
U.S. Cl. 58—28    7 Claims

ABSTRACT OF THE DISCLOSURE

An electronic watch utilizes two hairsprings to conduct current to a coil carried on a balance wheel. The hairsprings are electrically isolated from each other. A single hairspring clamping device, using one screw, clamps both hairsprings at their outer ends. The clamping device maintains electrical isolation of the hairsprings.

---

The present invention relates to horology, and more particularly to a hairspring clamping device.

One type of electrical powered horological instrument employs a coil carried on a balance wheel. The coil passes through one or more magnetic fields, receives a pulse of current from an electronic circuit, and impulses the balance wheel. This type of instrument requires some method of conducting current to the moving coil. Generally, the current is conducted to the coil by two separate hairsprings, both of which conduct current. One is connected to an electronic circuit and the other to the electrical ground, generally a frame member of the instrument. It is important that the two hairsprings remain electrically isolated from each other.

It has been suggested that the outer ends of the two hairsprings be individually clamped by separate hairspring clamping mechanisms, one of which would be grounded and the other insulated and connected with the electronic circuit. However, that system requires a number of parts and the skilled labor to clamp each hairspring.

It is the objective of the present invention to provide a single hairspring clamping device for an electronic watch, which device will clamp the outer ends of two hairsprings, will be relatively low in cost, will utilize relatively few parts, will maintain the electrical isolation of the two hairsprings from each other, will ground one of the hairsprings and provide a connection between the other hairspring and the electronic circuit, and will require only a single adjustment to clamp both hairsprings.

In accordance with the present invention, a hairspring clamping device is provided which clamps the outer ends of two hairsprings. The device consists of a first conductive hub, a second conductive hub and a separator between the hubs. The hubs are provided with deformable slits. An adjustment means, such as a screw, connects the clamping device to a frame member, such as the balance bridge. The adjusting device, after the outer ends of the two hairsprings are inserted in their respective slits, may be adjusted to narrow the slits and clamp both hairsprings. Both hairsprings are clamped simultaneously and with the same force.

In one embodiment the separator is made of a sufficiently soft plastic resin and the hairsprings protrude from their respective hubs into the separator, so that the adjustment means forces the hairspring ends into the plastic separator, which acts to retain them in place.

In another embodiment a wall of the slot is made relatively thin. The separator is constructed with slanting wedge faces. Upon tightening the adjustment device, the wedge faces of the separator force the thin walls to move and close the slits, thereby gripping the hairspring ends.

Other objectives will be apparent from the following detailed description of the inventors' best mode of practicing the invention, the description being taken in conjunction with the accompanying drawings.

Figure 1:
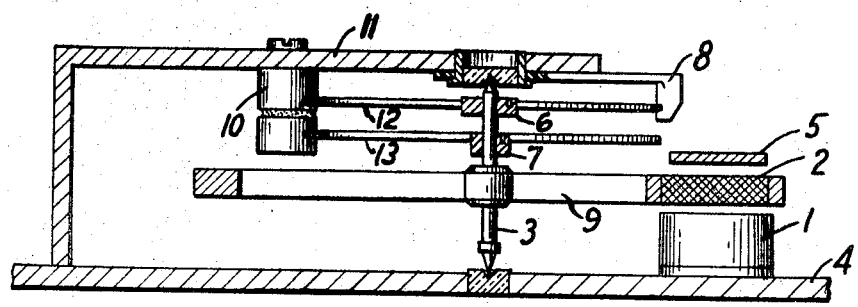
FIG. 1 is a side cross-sectional view of a portion of the watch mechanism showing the environment of the clamping device of the present invention.

The environment of the clamping device of the present invention is shown in FIG. 1 as being applicable to an electronic watch, although it may also be applicable to other horological instruments.

In FIG. 1 a balance wheel 9 carrying a coil 2 is mounted on a staff 3 which pivots between bearings mounted in a frame plate 4 and a balance bridge 11. A magnet 1, mounted on a shunt, is positioned beneath the path of movement of the coil 2, and an upper shunt 5 is mounted above that path and above the magnet 1. A regulator 8 is rotatably mounted on bridge 11. The inner ends of the hairsprings 12 and 13 are fixed into the hubs 6 and 7, respectively, the hubs 6 and 7 being mounted on the staff 3. A hairspring clamping device 10, described in detail below, clamps the outer ends of the hairsprings.

Figure 2:
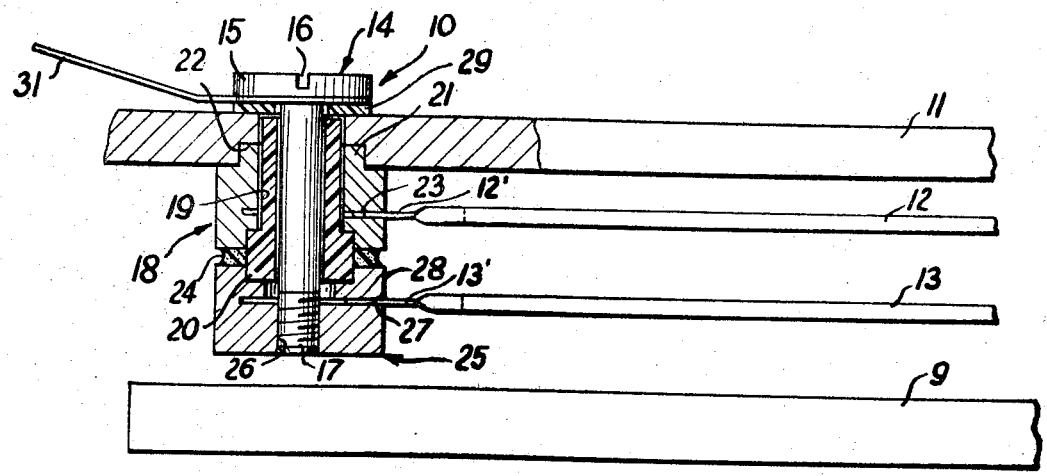
FIG. 2 is an enlarged side view, partly in cross-section, of the first embodiment of the invention.
Figure 3:
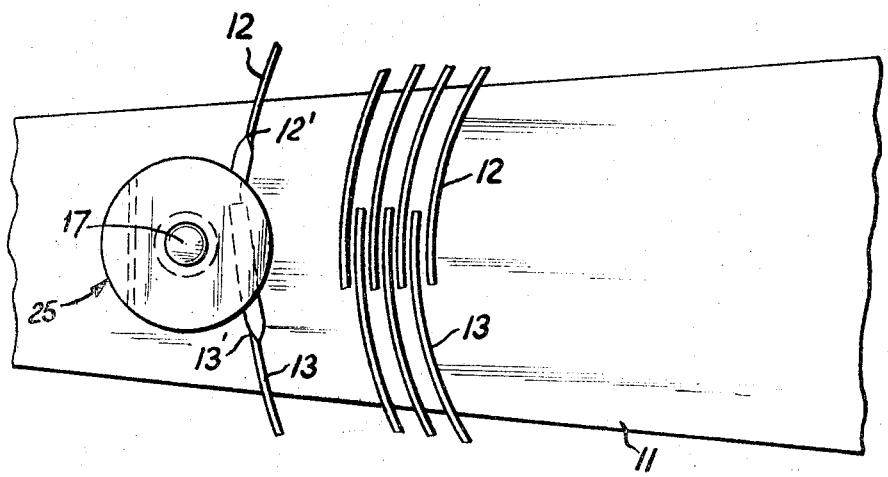
FIG. 3 is a bottom plan view corresponding to FIG. 2.

As shown in FIGS. 2 and 3, the hairspring clamping device 10 may be located on the balance bridge 11. The first hairspring 12 and the second hairspring 13 are located between the balance bridge 11 and the balance wheel 9. The clamping device 10 consists of a screw 14 having a head 15 with a slit 16 and a threaded shank 17. The head 15 is insulated from the bridge by an insulative washer 29. A top first clamping hub 18, having an internal bore 19, surrounds the upper portion of the shank 17. The first clamping hub 18 has an annular flange portion 21 which fits within a cavity 22 of the bridge balance.

The first clamping hub 18 has a slit 23. A plane passing through the slit 23 would be perpendicular to the axis of the bore 19. The clamping hub 18 is of an electrically conductive material, for example, brass or other metal, and is sufficiently flexible so that the slit 23 may be narrowed when pressure is applied to the bottom of the hub 18. A second clamping hub 25 has a threaded bore portion 26. It also has a slit 27, its slit also being perpendicular to the axis of the bore 26. The second clamping hub is also of an electrically conductive material such as metal and is sufficiently flexible so that pressure on its faces 28 would narrow the slit.

The shank 17 is partly surrounded by a tubular insulator 20, for example, of a hard plastic, having an enlarged bottom portion. The shoulders of the enlarged bottom portion fit into an annular groove in the bottom of hub 18 and a similar annular groove in the top of hub 25. The shoulders of the bottom portion fit tightly into the grooves and accurately locate the hubs. After assembly and clamping of the hairspring, the space between the hubs 18 and 25 is filled in with an insulative material 24. A suitable filler is a room temperature curing epoxy resin.

A wire or strip 31, connected to the electronic circuit, is positioned between screw head 15 and the insulative washer 29. The screw 14 conducts current from wire 31 to the second hub 25 and to the hairspring 13. The other hairspring 12 is grounded by being connected to the first hub 18 which is in good contact with balance bridge 11.

The outer ends of the hairsprings 12 and 13 are bent at 12' and 13', so that their ends are at a 90° angle relative to their bodies. The bending is required by the orientation of the slits 23 and 27.

Figure 4:
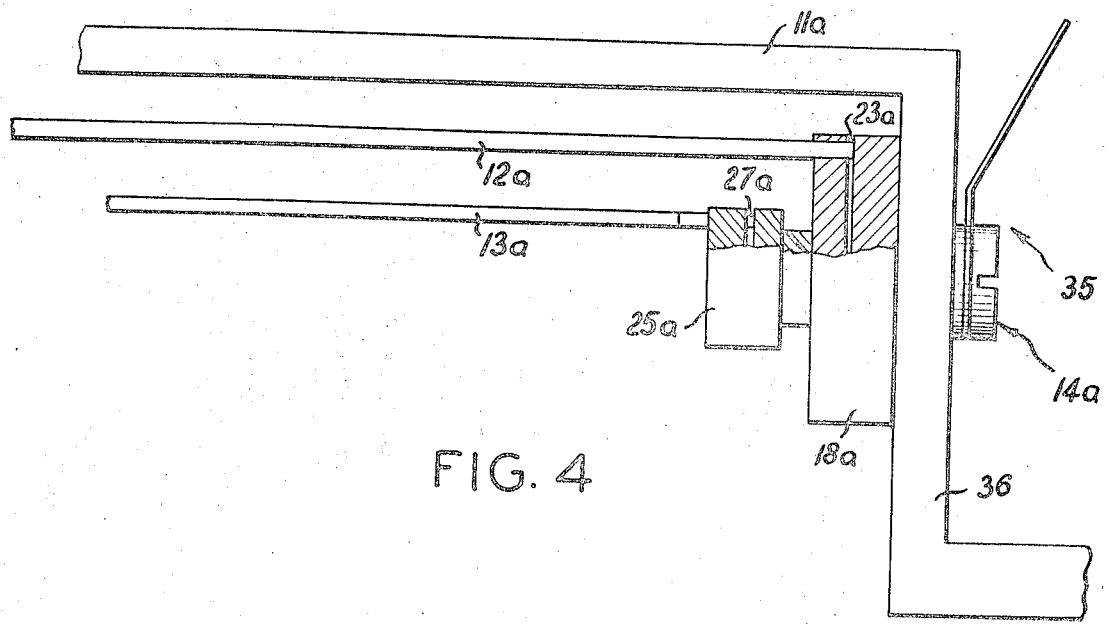
FIG. 4 is an enlarged side view, partly in cross-section, of the second embodiment of the present invention.

The hairspring clamping device 35, shown in FIG. 4, is similar in many respects to the previously described hairspring clamping device 10 shown in FIG. 2. It also consists of a screw 14a whose shank passes through a hole in the balance bridge 11a, and is screwed into screw threads in a second clamping hub 25a. An insulative separator is positioned between the bottom clamping hub 25a and the top clamping hub 18a. The internal structure of the clamping device 35 is the same as is shown in connection with clamping device 10 in FIG. 2. In this embodiment, however, the clamping device is placed on a flange 36 (support) of the balance bridge 11a. Consequently, its orientation as to the hairsprings is different. In the embodiment of FIG. 4, it is not necessary to twist the ends of the hairsprings as the flat hairsprings 12a and 13a may be directly positioned in their respective slots 23a and 27a.

Figure 5:
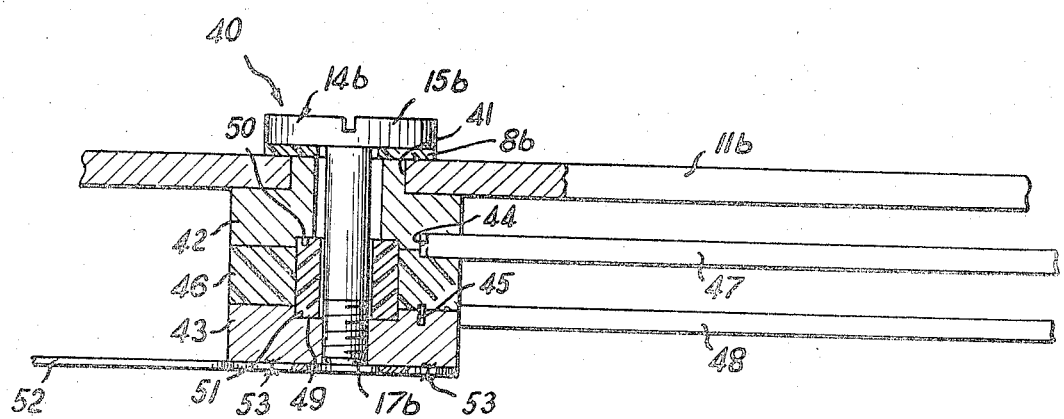
FIG. 5 is an enlarged side view, partly in cross-section, of the third embodiment of the present invention.
Figure 6:
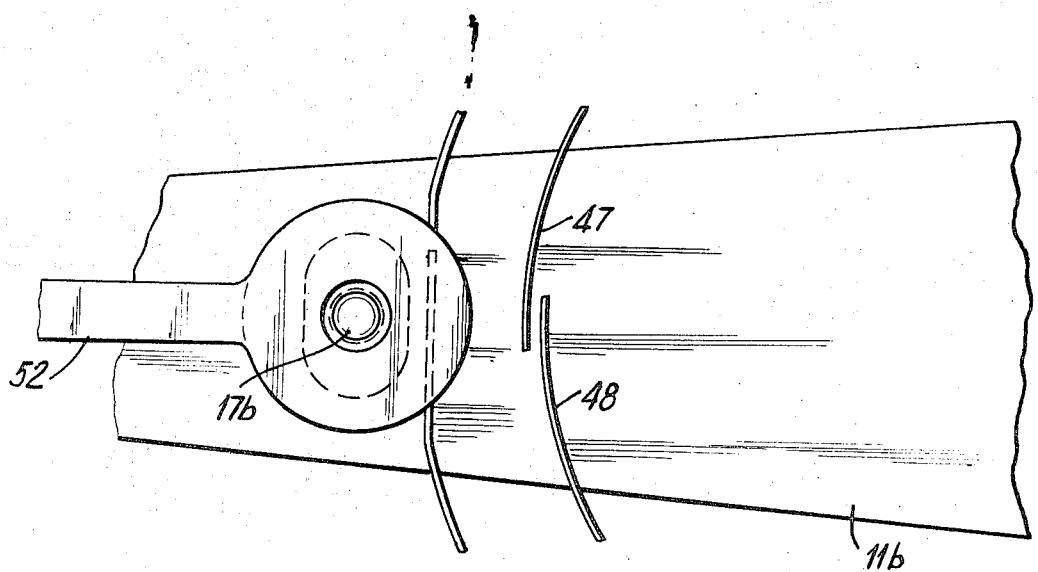
FIG. 6 is a bottom plan view corresponding to FIG. 5.

An alternative hairspring clamping device is shown in FIGS. 5 and 6. In the hairspring clamping device of FIGS. 5 and 6, a balance bridge 11b has a hole 41 through which the shank 17b of screw 14b protrudes. An insulating washer 8b is positioned between the screw head 15b and the balance bridge 11b. The top first clamping hub 42 and the bottom second clamping hub 43 each have a first slit 44 and 45, respectively. The slits 44 and 45 are less deep than the height of the hairsprings which they are adapted to hold. These slits are parallel to the axis of the shank 17b, that is, a plane through those slits would be parallel to that axis. The annular plastic insulator 46, positioned between the hubs, is of a thermoplastic material such as polyethylene. It is sufficiently soft so that it may be cold pressed or cold flowed by the pressure from the hairsprings 47 and 48. A harder insulator 49, which may also be of a plastic material, is in the form of a tubular bushing. The plastic insulator 49 is positioned within the circumference of the annular insulator 46. The top shoulder of insulator 49 fits within an annular depression in the clamping hub 42 and its bottom fits within an annular depression in the clamping hub 43. The dimensions of the plastic part 49 and the annular depressions 50 and 51 are closely controlled so that the plastic part 49 serves to position and lock the clamping hubs 42 and 43. The current connection may be by means of a wire or strip 52 which is spot-welded at 53 to the conductive clamping hub 43.

Figure 7:
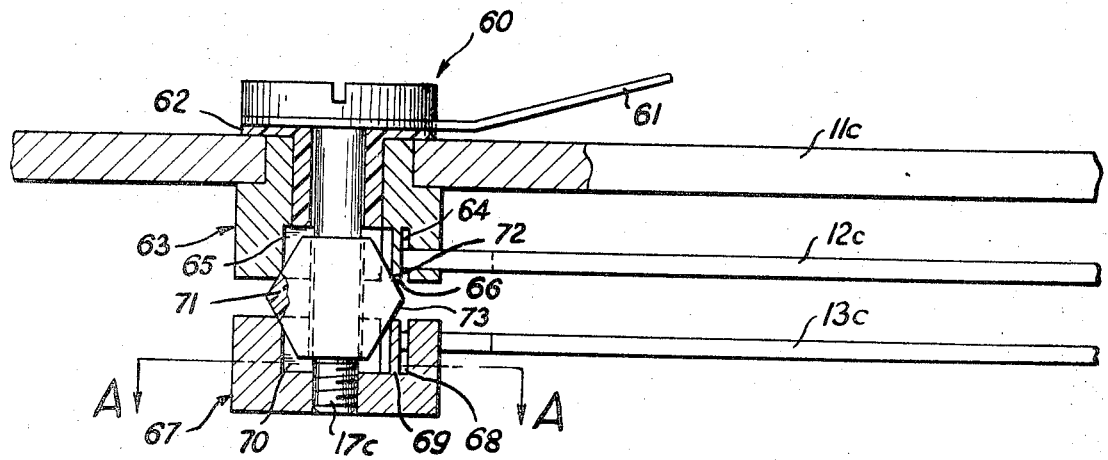
FIG. 7 is an enlarged side view, partly in cross-section, of the fourth embodiment of the present invention.
Figure 8:
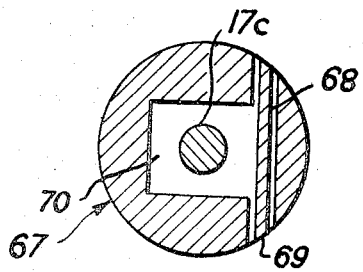
FIG. 8 is a cross-sectional view taken along the line A—A of FIG. 7 and looking in the direction of the arrows.

A still further embodiment of the present invention is shown in FIGS. 7 and 8.

As in the previously described embodiments, the clamping device 60 includes a screw having a shank 17c which protrudes through a hole in the balance bridge 11c. The upper portion of the shank is surrounded by a unitary washer and tubular insulator 62, the washer portion of which may be considered a flange of the tubular member. The current connection to the electronic circuit is by means of a wire or strip 61, whose end is positioned between the head of the screw and the top of the washer portion of the insulator 62. A first top clamping hub 63 is arranged with its raised annular flange portion within the hole of the balance bridge 11c. The bottom portion of the first hub 63 has a cavity 65, for example, of a square shape. A slit 64 is cut in the hub 63 such that a plane through the slit would be parallel to the axis of the bore of the hub 63. The slit 64 forms a wall 66 which may be bent under pressure.

The bottom second hub 67 is similarly constructed with a cavity 70, a slot 68 and a bendable wall 69. The shank 17c screws within the bore of the hub 67. An insulator 71 of hard plastic material is positioned between the hubs 63 and 67. The insulator has a top slanting wedge face 72 which is positioned against the free end of the wall 66. The insulator 71 has a second slanting wedge face 73 which is positioned against the free edge of the wall 69. The hairsprings 12c and 13c are placed in their respective slits 64 and 68. Then the screw is turned, bringing the hubs 63 and 67 closer together. Simultaneously, the free ends of the wall 66 and 69 are bent by the wedging action of the slanting faces 72 and 73, respectively. The bending of the walls clamps the hairsprings 12c and 13c.

We claim:

1. In a horological instrument including a frame member, a source of electric current, an electric circuit connected to the current source, a balance wheel assembly including a balance wheel fixed to a balance wheel staff, the said balance wheel staff being pivotally mounted on said frame member, a coil carried by said balance wheel, and two electrically conductive hairsprings connected electrically at their inner ends to the coil, a hairspring clamping device fixed to a frame member and clamping both hairsprings at their outer ends, said clamping device consisting of first and second metal clamping hubs each having a deformable slit, an insulative separator positioned between said first and second hubs, and adjustable means connected between said first hub and said frame member and insulated from said second hub to deform and close the slits in the first and second hubs.

2. A clamping device as in claim 1 in which the first hub has a body, a slit in said body, and a screw threaded hole having its axis perpendicular to the plane of said slit; the second hub has a body, a slit in said body, and an opening through said body having its axis perpendicular to said second slit; and the adjusting means is a screw having the bottom of its shank screwed into the hole in the first hub and having its shank smaller than the opening through the second hub.

3. A clamping device as in claim 2 wherein a tubular insulator surrounds the portion of the shank within the second hub.

4. A clamping device as in claim 1 in which the first hub has a body, a slit in said body, and a screw threaded hole having its axis parallel to the plane of said slit; the second hub has a body, a slit in said body, and an opening through said body having its axis parallel to said second slit, and the adjusting means is a screw having the bottom of its shank screwed into the hole in the first hub and having its shank smaller than the opening through the second hub, and the separator is of a deformable plastic resin.

5. A clamping device as in claim 4 wherein a hard tubular insulator surrounds the portion of the shank within the separator.

6. A clamping device as in claim 4 wherein the separator has a top wedge face and a bottom wedge face which are at an angle to the axis of the screw shank.

7. A clamping device as in claim 6 wherein the first and second hubs each have a cavity forming a thin wall for the slit, the said wedge faces being positioned against said thin walls.

References Cited

UNITED STATES PATENTS 3,084,316   4/1963   Zemla _____ 58—28B

RICHARD B. WILKINSON, Primary Examiner

E. C. SIMMONS, Assistant Examiner

U.S. Cl. X.R.

58—114, 115